Patented Sept. 13, 1938

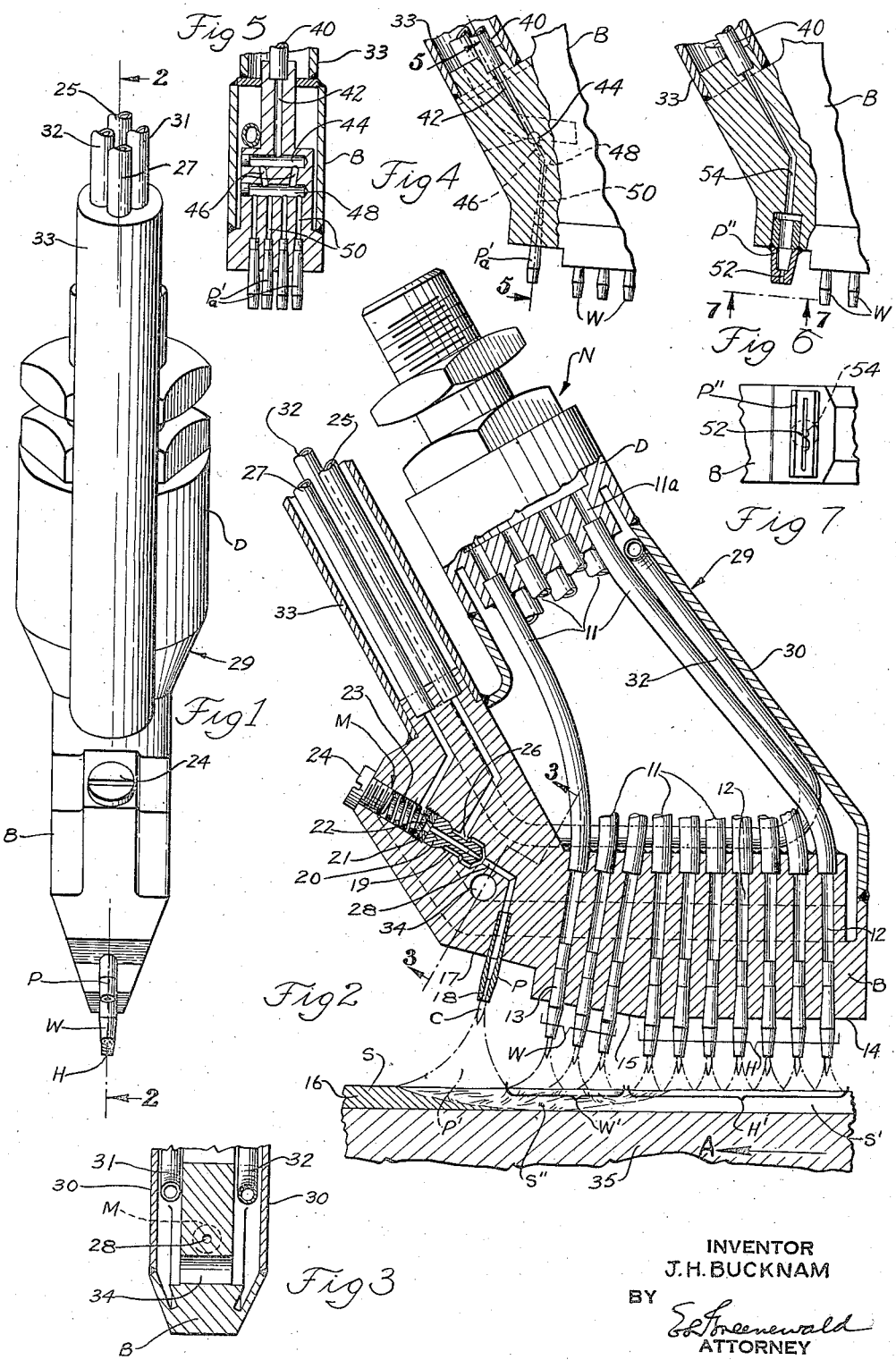

2,130,261

UNITED STATES PATENT OFFICE 2,130,261

APPARATUS FOR WELDING

James H. Bucknam, Cranford, N. J., assignor, by mesne assignments, to Union Carbide and Carbon Corporation, a corporation of New York Application May 29, 1934, Serial No. 728,133

11 Claims. (Cl. 113—59)

This invention relates to an apparatus for and process of fusion welding, and particularly it concerns an apparatus and process for protecting the puddle of molten metal from exposure to air, and for producing a ductile or normalized weld.

In welding a seam by the fusion process, or in depositing a line of fused metal upon a metallic body, the metal ahead of the welding point is usually preheated and progressively raised to the melting temperature at or just ahead of the welding point as the means for heating the metal is moved in respect to the work along the line of the metal to be fused. As the metal is fused the molten puddle in rear of the welding point may be exposed to the influence of the air and made brittle and porous due to oxidation and/or to occlusion of gases which are derived principally from the air. Such exposure of the weld may also cause the weld to be hardened by the too rapid extraction of heat therefrom by the air and the adjacent body metal. These detrimental effects on the weld are accentuated as the speed of welding is increased, because at high speeds the puddle passes quickly out of the heating zone and a greater area of liquefied metal is exposed to the air than when lower welding speeds are used. In such a case the liquefied metal after passing out of the welding zone receives insufficient heat therefrom to prevent the weld from being hardened by the rapid flow of heat to the surrounding air and adjacent metal. Consequently, heretofore welding speeds have been limited, particularly where high quality welds on sheet metal were to be made.

Therefore, among the objects of this invention is to increase the welding speed and to protect the molten metal in rear of the welding point from attack by the air and to prevent the weld from being chilled too rapidly and thereby limit or prevent oxidation of the metal and the absorption of gases in the weld, thus preventing porosity of the weld, and providing a weld wherein the ductility of the metal is substantially unimpaired.

The above objects may be accomplished by directing upon the extended puddle in rear of the welding point a gas flame, the heating effect of which upon the puddle will be of a relatively low value as compared to the heat applied to the weld. Such objects and novel features of this invention will be more clearly understood from the following description and accompanying drawing in which:

Fig. 1 is a rear end view of the blowpipe nozzle illustrating one embodiment of this invention in the form of an apparatus;

Fig. 2 is a vertical section on line 2—2 of Fig. 1;

Fig. 3 is a transverse cross section taken along line 3—3 of Fig. 2, looking in the direction of the arrows;

Fig. 4 is a fragmentary side elevation of another embodiment of the invention, parts being shown in section and other parts being omitted;

Fig. 5 is a cross section taken along the line 5—5 of Fig. 4, looking in the direction of the arrows;

Fig. 6 is a fragmentary side elevation of still another embodiment of the invention, parts being broken away and other parts omitted; and Fig. 7 is a fragmentary bottom view of the protective nozzle and associated parts of Fig. 6.

The method may be carried out by an apparatus such as is shown in the drawing. The apparatus illustrated in the drawing discloses one embodiment of this invention. It comprises a nozzle N adapted to be supported by a machine or the like for directing heating flames H', W' and P' upon the work S to be welded. Preferably the heating flames are produced by the combustion of a mixture of a hydrocarbon gas, such as acetylene, with oxygen. Either the nozzle N or the work S may be so moved that the flames are directed upon and progressively moved along a seam S' to be welded. For the purpose of illustrating this invention it will be assumed that the work S is moved in the direction indicated by the arrow A which points towards the rear end or heel of the nozzle N. As the work S is moved from the front end or toe of the nozzle N toward the rear end of the nozzle, the preheating flames H' preheat the edges of the seam S' and heat them up to fusion point; the welding flames W' are then directed upon this preheated portion of the seam and fuse the edges into a molten puddle S" and keep the latter covered with highly heated combustion gases and thereby excludes the air therefrom and prevents the oxidation of the metal and/or the inclusion of gases derived from the air into the weld. The protecting flame P' subsequently is directed upon the puddle, and supplies sufficient additional heat thereto to control heat losses and normalize the weld.

The quantity and the intensity of the heat supplied to the puddle S" by the protecting flame P' are controlled to prevent the flame from introducing sufficient heat into the puddle to maintain it in the molten state, but to permit the flame to introduce sufficient heat into the puddle to prevent it from being cooled too rapidly by flow of heat therefrom to the air and work S. The quantity of heat supplied to the puddle S" may be controlled by regulating the quantity of gas supplied to the flame P' or by adjusting the ratio of combustible gas to combustion-supporting gas; and the intensity of the heat at the surface of the puddle may be regulated by varying the distance of the end of the inner cone C from the puddle. Preferably this distance should be greater than the distance of the inner cones of the welding flames W' from the puddle. With the use of a protecting flame P' of this character the welding speed may be increased, and a ductile or normalized weld may be produced which is substantially free from oxidation products and/or occluded gases of the air and blowholes.

The nozzle N comprises a nozzle block B having a plurality of closely spaced preheating tips H and welding tips W attached thereto for supplying the combustible mixture to the preheating and welding flames H' and W', respectively, which operate in the usual manner for preheating the edges of the seam S' and for producing the puddle S''. A protecting tip or tips P is attached to the rear end of the block B for supplying a combustible mixture to the flame P' from an independent source. The preheating and welding tips H and W are supplied with a combustible gas delivered from a common source, such as from a gas mixer (not shown) which delivers the gas to a distributor D. The protecting and normalizing tip P is supplied with a combustible mixture from a mixer M located in the rear end of the block B.

The respective preheating tips, welding tips and weld-protecting tip are removably secured in smooth-walled passages 12 in the nozzle block, and are made of relatively thin-walled, highly heat-conductive metal, such as copper. Preferably a portion at least of the outer wall of each tip mounted within the passages 12 is slightly tapered inwardly toward its upper ends; and the walls of the said passages 12 are correspondingly tapered and are reamed to receive the upper portions of the tips with a gas-tight, driving fit, as described more fully in my copending application for U. S. Letters Patent, Serial No. 718,474, filed March 31, 1934, for "Blowpipes". This construction permits an unusually close arrangement of the plurality of tips. Furthermore, any tip may be easily removed with a pair of pliers, and can be replaced by a new one which may be driven into place with a wooden mallet or the like.

The gas mixture flows from the distributor D through a plurality of conduits 11 which extend from outlet passages 11a in the distributor to passages 12 in the nozzle block B, into the latter of which the shanks 13 of the tips H and W are inserted. A step or face 14, substantially parallel to the surface of the work, is formed in the bottom face of the block B to receive the tips H; and an upwardly and rearwardly inclined step or face 15 is formed in the face of the block B for the tips W. Thus the tips H are so arranged in the step 14 that the flames H' may be directed substantially perpendicular to the surface of the work; and the tips W are so arranged in the step 15 that the flames W' may be directed at a small angle rearwardly towards the finished weld 16.

The protecting and normalizing tip P is secured in the bore in a rear step or working face 17 located behind the welding tips W, and arranged and adapted to discharge the protecting and normalizing flame and curtain of gases P' upon the molten puddle S'' in the rear of the welding tips W. The flame formed by this tip is soft and bushy and is adapted to supply sufficient heat to the puddle to prevent it from being chilled but insufficient heat to keep the puddle molten. This permits the puddle to solidify while covered by the flame. To facilitate the securing of the above flame characteristics the protecting and normalizing tip P is suitably spaced from the welding tips W and is inclined rearwardly towards the completed weld so that the flame P' and the gases produced thereby will blanket the portion of molten puddle not covered by the welding flames W'. Also, the discharge orifice 18 of the tip P is so spaced from the weld that the hottest portion of the flame, at the end of the inner cone C, will be removed from the weld and will not maintain the metal in the fused state. In order to space the discharge orifice 18 a suitable distance above the weld puddle and permit a tip having a convenient length to be used, to provide a sufficiently large body of protective gases, the rear step 17 in the face of the block B is set backward from the bottom face of the block further than the other steps therein.

The separate mixer M for supplying the combustible mixture to the protecting and normalizing tip P, is located in a bore 19 formed in the rear end of the nozzle block B. The mixer M comprises an injector nozzle 20 secured in the bore 19 by a ring nut 21. A flat ringlike screen 22 is held on top of the ring nut 21 by a spring 23 which is compressed between the screen 22 and a screw plug 24 which closes the end of the mixer bore 19.

The mixer M is used for separately supplying a combustible mixture to the protecting tip P in order that the flame produced thereby may have a different characteristic from that of the welding and preheating flames. For example, it is desirable that the protecting flame P' be softer and have a lower temperature than the welding and preheating flames. Thus, a neutral or carburizing protecting flame or a protective blanket of non-oxidizing gases thus can be provided without changing the character of the other flames. These features are made available by the use of the independent mixer M.

A combustible gas, such as acetylene, is supplied through a pipe 25 to a chamber 26 around the end of the mixer injector nozzle 20. A combustion-supporting gas, such as oxygen, is supplied to the rear end of the injector nozzle 20 through a pipe 27 connected thereto. The oxygen and the combustible gases are discharged through the mixer throat 28 and projected through the orifice 18 in the protecting tip P which is connected to the throat in the mixer M.

The nozzle block B and the gas passages leading thereto are cooled by water or the like circulated in a jacket 29, comprising a sheet metal case 30 secured to the block B and gas distributor D. The cooling water is supplied to the jacket 29 through an inlet tube 31 which extends into a bore in the block B above the mixer M and which discharges the water at the bottom of the jacket 30. The water may be circulated through the jacket and discharged from the top thereof through an outlet tube 32 which extends through a bore in the rear end of the block B and to a point near the top of the jacket where it draws off the cooling fluid. The inlet and outlet tubes 31 and 32 extend upwardly from the rear end of the block B and parallel with the tubes 25 and 27, which supply gas to the mixer M. This set of four tubes is enclosed in a tubular case 33 which is secured to the nozzle block B. A passage 34 extends transversely across the block B and underneath the mixer M to additionally cool the latter. This subject matter is more fully disclosed and claimed in copending application Serial No. 726,216, filed May 18, 1934 in the name of F. C. Geibig.

Permanent gas-tight connections have been made between the distributor D and the jacket 29 and conduits 11, respectively, and between the jacket 29 and the case 33 and conduits 11, by means of silver solder or the equivalent.

In the operation of the apparatus illustrated in Fig. 2, the gas mixture supplied to the distributor D and discharged from the preheating and welding tips H and W is ignited and regulated in the usual manner to provide the proper preheating and welding flames H' and W'. The gas mixture flowing from the mixer M and discharged from the protecting and normalizing tip P is also ignited and regulated in the usual manner to provide a suitable non-oxidizing flame P' for protecting and normalizing the weld. For moving the work S past the nozzles, any of the various kinds of apparatus well known in the art having a movable supporting member, such as the member 35 for supporting the work, may be used. As the seam S' is passed underneath the flames H', W', and P' its edges are progressively fused and rapidly welded together.

It will be understood that, if desired, the gas discharge orifices in the nozzle block may be arranged close to one another in rows, curved lines, or other configurations suitable for welding or other heating process, such as fire-finishing glass edges, where a concentration of small flames is desirable.

It is within the scope of the invention to substitute for the protective blanket of heated combustion gases heretofore described, a blanket or body of heated or unheated inert or non-oxidizing gases such as nitrogen, hydrogen, methane, or carbon monoxide. Figs. 4 to 7 illustrate apparatus adapted for this purpose. In Figs. 4 and 5, the nozzle block B is provided with a plurality of closely adjacent, laterally-spaced protecting tips Pa' communicating with an inert gas conduit 40 through the passages 42, 44, 46, 48 and 50. A single tip Pa' directed towards the line of the weld or the zone to receive protection may be substituted for the plurality of tips shown in these figures. However, the use of two or more tips Pa' facilitates the effective blanketing with non-oxidizing gases of a band or zone of the metal of sufficient width at and adjacent the welding zone to insure full protection for all metal exposed to high temperatures.

A single transversely-slotted tip P'', such as that illustrated in Figs. 6 and 7, in some instances may be substituted advantageously for the plurality of laterally-spaced tips Pa'. This tip P'', having the outlet slot 52 therein, is directly connected with the gas conduit 40 by a suitable passage 54 in the nozzle block B.

Obviously, the nobbles Pa' or P'' also may be utilized in the construction illustrated in Figs. 1 and 2. In such case each nozzle Pa' or P'' communicates in suitable manner with the gas outlet from the gas mixer M.

In operation, the protection nozzles Pa' or P'' serve to lay down along and around the line of the highly-heated weld a sheet or layer of non-oxidizing gases which, in instances where the heated gases are sufficiently hot, also may function to temper the metal along the line of the weld.

By the practice of the present invention it is readily possible to employ very high welding speeds in welding quality sheet steels, with the production of a clean-surfaced, solid and ductile weld. Welding speeds of 50 inches and more per minute now may be employed effectively in connection with the use of automatic welding machinery.

The invention is susceptible of modification within the scope of the appended claims.

I claim:

1. A nozzle adapted to apply heat to metal work comprising as a unit a nozzle block; preheating and welding tips secured to said block at substantially the same elevation with respect to said work; said preheating and welding tips being supplied from a common source of combustible gas; at least one protecting and normalizing tip in rear of said tips at a substantially different elevation with respect to the aforesaid tips and said work and at a divergent angle to at least some of said aforesaid tips; and an adjustable mixer operatively associated with the said nozzle block for supplying an independent supply of gas to the protecting and normalizing tip of less heating effect than that of said common source of combustible gas.

2. A nozzle adapted to apply heat to metal work comprising as a unit a nozzle block; preheating and welding tips secured to said block at substantially the same elevation with respect to said work; said preheating and welding tips being supplied from a common source of combustible gas; a protecting and normalizing tip in rear of said tips at a substantially different elevation with respect to said other tips and said work and inclined rearwardly toward said work; a mixer within the nozzle block for supplying an independent supply of combustible gas to the protecting and normalizing tip of less heating effect than that of said common source of combustible gas; said mixer having a bore; a nozzle secured in said bore, and having a passage therethrough; a screen in said bore covering said passage; a spring in said bore; and a closure cap for said bore adapted to compress said spring against said screen and retain said spring in place over said passage.

3. A welding nozzle comprising a nozzle block having a stepped face including a forward step, an intermediate step, and a rear step; each of said steps being bored to receive at least one flame-forming tip; closely-spaced, substantially parallel preheating tips secured in said bores in said forward step, said preheating tips being adapted to discharge preheating flames in a direction substantially perpendicular to the forward face; closely-spaced substantially parallel welding tips secured in the said bores in said intermediate step, said welding tips being adapted to direct welding flames at a slight acute angle with respect to and away from the said preheating jets; and a protective and normalizing tip secured in a bore in the rear step, the last-named tip being directed to discharge a protective gas of less heating effect than said preheating and welding flames at a slight angle with respect to and away from said welding tips, the said protecting tip having a discharge orifice disposed between the nozzle block and a plane normal to the axes of the welding jets and passing through the discharge orifices of the latter.

4. A nozzle adapted to apply heat to metal work comprising a nozzle block having a working face, a preheating tip, a welding tip, and a work-protective tip respectively secured to the said face and longitudinally spaced therealong in the same vertical plane and directed to discharge gas in non-intersecting paths, the said protective tip having its discharge orifice elevated a substantial distance from the discharge orifice of the welding tip inclined rearwardly toward said work, and normally adapted to be spaced farther from said work than said other tips, means for supplying a combustible gas mixture to the preheating tip and the welding tip respectively, and independently-controlled means for supplying a gas of less heating effect than said combustible gas to the said work-protective tip.

5. A welding nozzle comprising a nozzle block, preheating and welding tips secured to said block and adapted to direct high temperature heating flames upon work from substantially the same elevation; a transversely slotted tip disposed rearwardly of the said tips and at a different elevation with respect thereto and to said work, adapted to distribute a sheet of a protective gas obliquely upon said work at and adjacent a welding puddle subsequent to exposure of the work to welding heat; and means for supplying said tip with a lower temperature protective gas.

6. Welding apparatus comprising the combination of a nozzle block having a forward step and a rearward step, said rearward step being spaced above said forward step and normally maintained at a greater elevation relative to work being welded than said forward step; preheating and welding tips secured to said forward step; means for supplying said tips with a combustible mixture adapted to form a high temperature heating flame; at least one tip secured to said rearward step and inclined rearwardly from at least some of said other tips, the discharge orifice of said one tip being maintained at a greater elevation from said work than the orifices of said preheating and welding tips; and means carried by the nozzle block for supplying said last-mentioned tip with a lower temperature protective gas, said means including a passage in said block connecting with said tip.

7. A nozzle adapted to apply heat to metal work comprising a nozzle block having a plurality of faces, and having a group of parallel preheating gas passages provided with preheating tips and a group of parallel welding gas passages provided with welding tips respectively carried upon the respective faces and at substantially the same elevation to said work; the respective passages of each of the said groups being in communication with a source of a combustible gas mixture; the said nozzle block having another face having therein a passage for a protective gas; at least one tip connected with the last-named passage and carried upon the last-named face at a substantially different elevation with respect to said other tips and said work; and means within the said block for delivering a lower temperature gas than said combustible gas mixture to the last-named tip, said welding gas passages being inclined at an angle with respect to, but away from, the protective gas passage to discharge the welding gas and the protective gas in divergent streams.

8. Welding nozzle as defined in claim 7, wherein each of the welding gas passages is inclined at an angle with respect to but away from said preheating gas passages so as to discharge the preheating gases and the welding gas in divergent streams.

9. A welding nozzle comprising a nozzle block; preheating and welding tips secured to said block and supplied with a high temperature gas, said tips being adapted to direct high temperature heating flames upon work at substantially the same elevation; means disposed rearwardly of said other tips, as well as at a substantially different elevation with respect to said other tips and said work, said means being adapted to distribute a sheet of protective gas obliquely against the work subsequent to the exposure of said work to said high temperature heating flames; and means for supplying said rearwardly disposed means with a lower temperature protective gas.

10. A welding nozzle comprising a nozzle block, preheating and welding tips secured to said block and adapted to direct high temperature heating flames upon work from substantially the same elevation; a row of transversely spaced protective tips disposed rearwardly of the said tips and at a different elevation with respect thereto and to said work and adapted to distribute a sheet of a protective gas obliquely upon said work at and adjacent a welding puddle subsequent to exposure of the work to welding heat; and means for supplying said protective tips with a lower temperature protective gas.

11. A welding nozzle having preheating jet orifices, welding jet orifices, and a protecting jet orifice; means for supplying gas from a common source to said preheating and welding jet orifices; said protecting jet orifice being disposed a substantial distance from planes respectively passing through and normal to the axes of said preheating and welding jet orifices; the axis of said protecting jet orifice being inclined rearwardly from the axes of at least some of said other orifices; and a mixer for independently supplying a lower temperature gas than that of said common source to said protecting jet orifice.

JAMES H. BUCKNAM.